United States Patent [19]

Fasack et al.

[11] Patent Number: 4,823,290
[45] Date of Patent: Apr. 18, 1989

[54] METHOD AND APPARATUS FOR MONITORING THE OPERATING ENVIRONMENT OF A COMPUTER SYSTEM

[75] Inventors: Martin L. Fasack, Port Washington, N.Y.; William A. Rutz, Brookfield Center; Robert G. Voll, Southbury, both of Conn.

[73] Assignee: Honeywell Bull Inc., Minneapolis, Minn.

[21] Appl. No.: 76,235

[22] Filed: Jul. 21, 1987

[51] Int. Cl.⁴ .................. G06F 15/20; G05B 23/02
[52] U.S. Cl. ............................ 364/550; 340/588; 340/825.06; 340/870.17; 364/557
[58] Field of Search ............... 364/418, 550, 557; 340/501, 588, 589, 825.06, 870.17

[56] References Cited

U.S. PATENT DOCUMENTS

| | | | |
|---|---|---|---|
| 3,277,458 | 10/1966 | Greenwood | 340/588 |
| 3,596,264 | 7/1971 | Ciemochowski | 340/234 |
| 3,688,292 | 8/1972 | Snively | 340/270 R |
| 3,740,718 | 6/1973 | Melvin, Jr. | 340/168 S |
| 3,931,619 | 1/1976 | Moore et al. | 340/588 |
| 4,163,216 | 7/1979 | Arpino | 340/152 R |
| 4,260,981 | 4/1981 | Yamauchi et al. | 340/870.11 |
| 4,315,296 | 2/1982 | Hancock | 340/588 |
| 4,356,475 | 10/1982 | Neumann et al. | 340/521 |
| 4,372,692 | 2/1983 | Thomae | 364/557 |
| 4,573,132 | 2/1986 | Boothman et al. | 364/557 |
| 4,575,806 | 3/1986 | Aldrich et al. | 340/501 |
| 4,581,604 | 4/1986 | Kimura et al. | 340/521 |
| 4,602,872 | 7/1986 | Emery et al. | 364/557 |
| 4,698,756 | 10/1987 | Gonzalez et al. | 340/501 |
| 4,737,917 | 4/1988 | Perron | 364/557 |

Primary Examiner—Parshotam S. Lall
Assistant Examiner—Kevin J. Teska
Attorney, Agent, or Firm—John S. Solakian; Lewis P. Elbinger

[57] ABSTRACT

A method and apparatus features a system for automatically monitoring the operating environment and other physical conditions around and in which a host computer system operates. Sensors located around a computer system, including inside equipment cabinets and under the floor where cabling and air are ducted, are used to collect data that is frequently and periodically collected and stored along with an indication of the time and data of collection. The stored data is checked against a list of environmental parameters for the location of each sensor and an indication given when measurements indicate an environmental condition is outside discrete limits and rates of change of conditions. The stored parameters may be changed at any time from a console of the computer system. The stored data is also used to prepare histograms that are used to indicate trends in environmental conditions that can point to potential problems that may then be remedied before actual problems arise, and to faulty computer system installation design. Generation of histograms may be requested from remote locations via telephone links and then forwarded over the links to the remote locations for analysis. Trouble conditions indicated by out of parameter limits checking causes alarms to be given at the computer site and to be selectively sent to remote sites to initiate remedial action. In addition, a failsafe monitoring operation monitors the communications between the computer system and the monitoring apparatus to detect troubles.

24 Claims, 8 Drawing Sheets

POINT TABLE FILE

| FIELD | TYPE OF INFORMATION |
|---|---|
| 1 | SENSOR INFORMATION (LOCATION, ETCETERA) |
| 2 | CHANNEL ADDRESS OF SENSOR (SID, MODULE, CHANNEL) |
| 3 | TYPE OF SENSOR |
| 4 | READ ALL SENSORS |
| 5 | SENSOR IDENTITY - FOR DATA CONVERSION |
| 6 | SENSOR MEASUREMENT UNITS |
| 7 | CORRECTION FACTOR |
| 8 | OFFSET FACTOR |
| 9 | ABSOLUTE LOW VALUE FOR SENSOR |
| 10 | ABSOLUTE HIGH VALUE FOR SENSOR |
| 11 | RATE OF CHANGE ALARM LEVEL |
| 12 | MINIMUM LEVEL ALARM |
| 13 | MAXIMUM LEVEL ALARM |
| 14 | NOISE COMPENSATION FIGURE |
| 15 | SENSOR ACTIVE / DISABLED |

ANALYSIS PROGRAM

FAILSAFE TIMER

FIG. 8

METHOD AND APPARATUS FOR MONITORING THE OPERATING ENVIRONMENT OF A COMPUTER SYSTEM

FIELD OF THE INVENTION

This invention relates to computer system protection, and more particularly to equipment functioning with a computer system for monitoring the environment in which the computer system operates to provide early warning of environmental conditions that can damage components of the computer system.

BACKGROUND OF THE INVENTION

In the prior art, large computer systems and large installations of a number of smaller computer systems and related peripheral equipment have suffered component and/or system failures caused by improper environmental operating conditions. Probably the most common of these failures is caused by excessive heat buildup in computer rooms and is caused by air conditioning system failure, or by improper air flow to some pieces of equipment. There exists little in the present art for minimizing failures caused by improper operating environment conditions except, for example, computer system operating personnel manually monitoring computer room temperatures and taking action when the temperature rises beyond an acceptable level. The effectiveness of such manual monitoring is limited because the system operating personnel are not always present in the computer room, particularly at times like weekends, and because some computer installations are remote and do not have system personnel on site every day. In addition, such manual temperature monitoring is also limited because a thermometer only reads the temperature at the spot at which it is mounted, and local "hot spots" inside of particular equipment cabinets are not detected before failure of the equipment inside cabinets. In addition, before a piece of equipment fails, excessive temperatures inside a cabinet caused by a "hot spot" cause a particular piece of equipment to operate as to introduce errors in the data output from the equipment, and from other equipment in the computer room that cooperate therewith.

Such computational problems and equipment failures caused by excessive temperatures are costly in terms of failed equipment that must be repaired or replaced, in terms of unreliable data output from the computer system, and in terms of computer system "down time". Accordingly, there is a need in the art for a computer system environment monitoring arrangement that can monitor different computer system environmental operating conditions at many points around and inside component parts of the computer system without constant human interaction. Such a monitoring arrangement should provide an output identifying what and where a potentially dangerous environmental operating conditions exist. This permits correction of problems before there is failure of equipment exposed to the excessive environmental operating condition, and minimizes errors caused by equipment subject to improper environmental operating conditions. In addition, there is a need in the art for a computer system environmental monitoring arrangement that can store data received from the outputs of a variety of sensors around and in a computer system. The stored data can be used to determine if rates of change of different environmental conditions are dangerous and need immediate attention. In addition, the stored data from the sensors can be used to create histograms showing trends in the operating environment of the computer room and in individual pieces of equipment therein.

SUMMARY OF THE INVENTION

The above stated and other needs of the prior art are satisfied by the present invention which is a computer environment monitoring system that cooperates with a host computer so that the host computer controls monitoring and analysis. This novel monitoring system utilizes a plurality of sensors of different types, such as air flow and temperature sensors, located in many places around a computer room, such as in equipment cabinets and in air plenums. The signals output from the sensors are periodically scanned using a sensor interface device and the data from the sensors is stored by the host computer system. When the output from any sensor exceeds a predetermined level, as determined by the host computer while running an analysis program, an alarm is given to make the computer system operating personnel aware of the condition while identifying the location and type of problem at the main console of the computer system. In addition, when rates of change of environmental conditions sensed by the sensors exceed predetermined rates, an alarm is given. Alarms from unattended computer installation sites are forwarded to attended locations using an autodialer.

The host computer system stores the data received from the sensors of the computer environment monitoring system and can then use the data to develop a histogram for each sensor showing change trends in the environment monitored by each sensor. These histograms can be analyzed and show potential problems before they become actual problems. In this manner corrective actions may be taken before potential problems turn into real problems. Sensor history data stored by the host computer system at unattended computer installation sites may be retrieved for analysis over a telephone line and modem connected to the unattended computer system. In addition, these histograms may be used to identify faulty computer installation designs so that installation design changes may be made before any problems occur.

DESCRIPTION OF THE DRAWING

The invention will be better understood upon reading the following detailed description in conjunction with the drawing in which.

DETAILED DESCRIPTION

Figure 1:
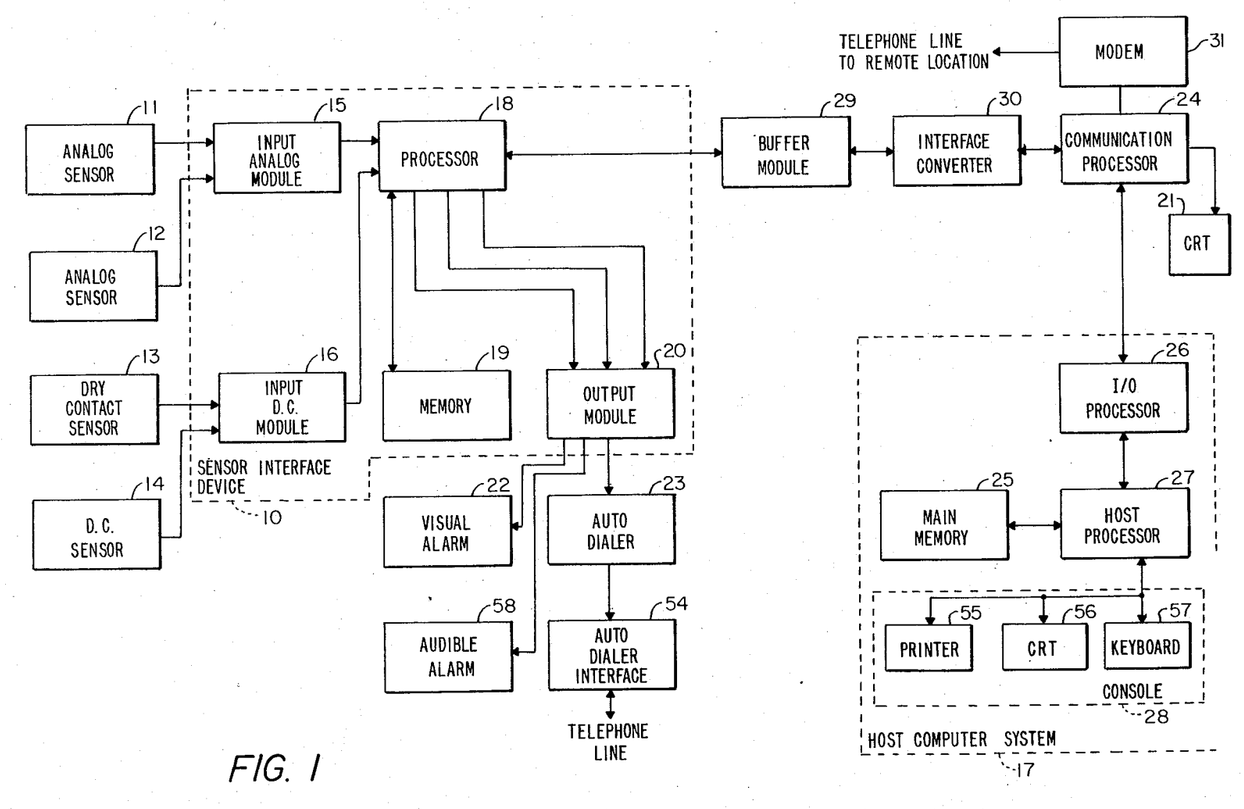
FIG. 1 shows a block diagram schematic of the apparatus functioning with a host computer for monitoring the operating environment of a computer system.

In FIG. 1 is shown a detailed block diagram of the novel apparatus for monitoring the environment in which a computer system operates. The apparatus comprises a sensor interface device (SID) 10 which is preferably a commercially available SID2000 available from the Microswitch Division of Honeywell, Inc. in Freeport, Illinois. A plurality of sensors 11 through 14 are used to provide inputs to SID 10 regarding environmental and other conditions in which a host computer system 17 operates. Sensors 11-14 are exemplary only and a wide variety of sensors may be utilized. For example, the sensors may monitor environmental conditions such as temperature, humidity, air flow, liquid level and airborne particulate matter. In addition, other types of sensors may monitor other conditions such as door openings and DC and AC power supply voltage levels. All these types of sensors are well known in the art and are not described in detail herein. When more sensors are used than can be handled by a single SID 10, more SID 10 devices may be added.

In FIG. 1 exemplary analog output sensors 11 and 12 are connected to inputs of input analog module 15, and exemplary direct contact output sensors 13 and 14 are connected to inputs of input direct current module 16. Signals outputs from analog sensors 11 and 12 are in analog form and must be converted to digital form before being input to processor 18 within sensor interface device 10. Input analog module 15 has a plurality of analog-to-digital converters and converts the analog signals input to it from analog sensors 11 and 12 into the required digital format. Sensors 11 and 12 are exemplary only and a number of types of analog sensors may be connected to the inputs of module 15. Examples of the types of analog sensors that provide analog output signals are listed in the last paragraph. However, in the prior art, sensors measuring a given environmental condition may be found that provide binary signal outputs rather than analog signal outputs. Binary signal output sensors have their outputs connected to an input direct current module.

In the preferred embodiment of the invention the temperature sensors may be Model TD2A sensors available from the Microswitch Division of Honeywell, Inc. These temperature sensors are nothing more than variable resistors and the outputs of the temperature sensors are not applied directly to an input analog module 15. To convert the resistance of the temperature sensors to a voltage for application to input analog module 15, a transmitter box (not shown), Model X82825 available from Microswitch Division is used. The transmitter box converts the resistance output from a temperature sensor to a voltage which can then be digitized by module 15. Another analog output sensor is a humidity sensor which is a Model HMW20U sensor available from Vaisala Corp. in Woburn, Massachusetts. Still another type of analog output sensor is an air flow indicator. Input analog module 15 is a Model SID-IAN-10-5 also available from the Microswitch Division of Honeywell, Inc.

The liquid level sensor that is used in the preferred embodiment of the invention is a Model D901 liquid detector available from Honeywell, Inc. in Newhouse, Scotland. The liquid level sensor is a zero to five volts direct current sensor so is connected to an input of input direct current module 16. An open door sensor is also a direct current sensor and is also connected to an input of direct current module 16. Open door sensors are widely available from many sources and provide an open or a closed contact when a door is opened. Module 16 responds to an open contact to output one binary number, and responds to a closed contact to output a second binary number to module 16. Direct current module 16 is a Model SID-IDC module available from the Microswitch Division of Honeywell, Inc.

Buffer module 29 is a Model SID-BUF Buffer Module available from the Microswitch Division of Honeywell, Inc. In addition, the stored program in memory 19 is also responsive to trouble indication signals received from host computer 27 to enable alarm functions. An output module 20 is responsive to alarm enable signals to activate alarms. More particularly, output module 20 is a direct current module and closes contacts to activate a visual alarm 22, an audible alarm 58, or an auto dialer 23 to send a pre-recorded message to a remote site. Output module 20 is a Model ORY-H module available from the Microswitch Division of Honeywell, Inc. Auto dialer 23 is configured to periodically place a pre-recorded trouble message call to a remote site until it is disabled from doing so. Accordingly, after the personnel at the remote site receive the pre-recorded trouble message via telephone, they must dial back to auto dialer interface 54 and transmit a coded tone signal that stops auto dialer 23 from recalling the remote site. The receipt of the acknowledgement call back causes processor 18 to store an indication of the receipt of the same. Host processor 27 queries processor 18 to determine if the acknowledgement call back has been received and, if the answer is affirmative, stores an indication including time and date of the call back message in an appropriate record in a history file in main memory 25. This provides a record that the alarm call was made and acknowledged. To permit auto dialer 23 to receive a call back another module is needed. It is a Model X86709 autodialer interface 54 that is available from the Microswitch Division of Honeywell, Inc. and is connected between autodialer 23 and the telephone line.

A host computer system 17 is served by the environment monitoring equipment described in the previous paragraphs. System 17 is shown in a very simple form since computer systems are so well known in the art. In this very simple form there is a host processor 27 which is accessed via an I/O processor in a manner well known in the art. Processor 27 has a main memory 25 associated therewith which may be made up of many of the types of memory presently used in computer systems. Main memory 25 is used to store programs and data used in the normal operation of host processor 27. In addition, main memory 25 is also used to store a number of program and data files for the operation of the environmental monitoring apparatus described herein. These data files include a sensor history file that is used to store the digitized sensor signals originally generated by sensors 11 through 14 and sent to host computer system 17 for storage and analysis, a sensor library file, a point table file, and a history file copy. The history file contains many individual records, one per sensor, to store the signals from the particular sensor.

Interface converter 30 is provided to perform a communication format translation function. Converter 30 is a Model 422-232 converter available from California Networks Controls in Torrance, California. Digitized sensor data temporarily stored in buffer module 29 has its communication format converted by converter 30, and is output therefrom to a communications processor 24 which operates to pass the digitized sensor data to host computer system 17. Processor 24 is a Model Data-Net 8 communication processor available from Honeywell Inc.

Digitized sensor data forwarded to host computer system 17 via its I/O processor 26 is stored in associated records in a history data file (HIST) and in a working copy table in main memory 25. There is record in the HIST file and working copy table for each sensor. A program named SCAN also stored in main memory 25 controls obtaining and storing the digitized data from all active sensors. The SCAN program also handles communications to console 28, and initiating any autodialer, visual and audible alarm enable requests to sensor interface device (SID) 10.

Periodically, responsive to the SCAN program stored in main memory 25, host processor 17 sends requests via circuits 26, 24, 30 and 29 to processor 18 in SID 10. Processor 18 responds to these requests to scan the sensors and send the data in binary form output from modules 15 and 16 to host processor 27. The sensor data is returned over the same communication path to host processor 27 which, under control of the SCAN program, stores the data in the appropriate records of the history data file in main memory 25. The time interval for requesting processor 18 to read and forward sensor data may vary from a short time such as one minute or less to a longer time such as five minutes or more as decided upon by the owner of host computer system 17. As digitized sensor data is received, host processor 27 under control of the SCAN program attaches the date and time that the data was received and stores them all in the appropriate records of the history file (HIST) in main memory 25. The newest five sets of sensor data are also stored in fields of a working copy table. These files and their records are discussed in more detail further in this specification.

The signals passed back and forth between host computer system 17 and sensor interface device 10 is in a particular communication format as defined in the SID2000 specification sheets available from Honeywell - Microswitch Division. The communication format has a first field which contains a leading framing character of two bytes in length. The framing character is two colon symbols (::) when host computer 17 is sending a request to SID 10. When SID 10 is sending data or information to computer system 17 other symbols are used. Two pound symbols (##) are used as the leading framing character by SID 10 when responding to a sensor data request from host computer 17. Two dollar symbols ($$) are used as the leading framing character when SID 10 is sending an error message to host computer 17, and two percent symbols (%%) are used as the leading framing character when SID 10 is sending other types of messages to computer system 17.

The second field of the communication format has two bytes that are for addressing purposes and are used only when there are more than one interface device 10, to identify a particular one of the devices 10. In addition, these two bytes are used only when a request is being sent to a device 10. When there is only one device 10 "01" is placed in this field. The third field is a command field having two bytes that is used to specify a command from host computer 17 for device 10 to perform. When device 10 transmits to computer 17, the third field has two zeros therein. The fourth and fifth fields each have two bytes, but these two fields are reserved and are not used at this time. The sixth field has two bytes that are used to specify the number of bytes in the following data field. The seventh field is the data field and has a length as specified by the sixth field. The data field is used to convey whatever data or other information is necessary to execute the command specified in field three. An example of the data is that read from a sensor. The eighth field is a checksum field of two bytes which is the twos complement of fields 2 through 7. The last and ninth field is for a trailing framing character to mark the end of the communication format. It is carriage return (C/R) when the transmission is from SID 10 to host computer system 17, and is a question mark (?) when the transmission is from host computer system 17 to SID 10.

When the environment monitoring system is initially installed, a sensor library (SLIB) is created which contains numerous information about each kind of sensor and its alarm limit levels. The sensor library file has one record for each kind of sensor, and the makeup of a record is described further in the specification with reference to FIG. 3. Once the environment monitoring system is functioning the contents of the SLIB are transferred to working records. There is a working record associated with each sensor. Each working copy table has information originally obtained from a point table (PTBL) file that is used to hold information transferred from the SLIB of the particular type of associated sensor plus the latest five readings from the particular sensor. In addition, all sensor readings, including the latest five readings, are stored in the appropriate records in history file (HIST) associated with the same sensor.

After the digitized sensor data, and date and time signals for each sensor are received, initially processed and stored in the HIST file and the working copy table, the SCAN program is ended and goes to sleep to be rerun any predetermined time later, which may advantageously be one minute. The SCAN program is described in greater detail further in this specification with reference to FIG. 4. Host processor 27 then runs an ANALYSIS, program to check the stored sensor data. To check the stored sensor data the sensor information in the point table (PTBL) is used. Each of the sensors 11 through 14 has a point table as part of its working copy table as previously mentioned. The point table may be modified at any time from console 28 while the environmental monitoring equipment is in operation.

Figure 2:
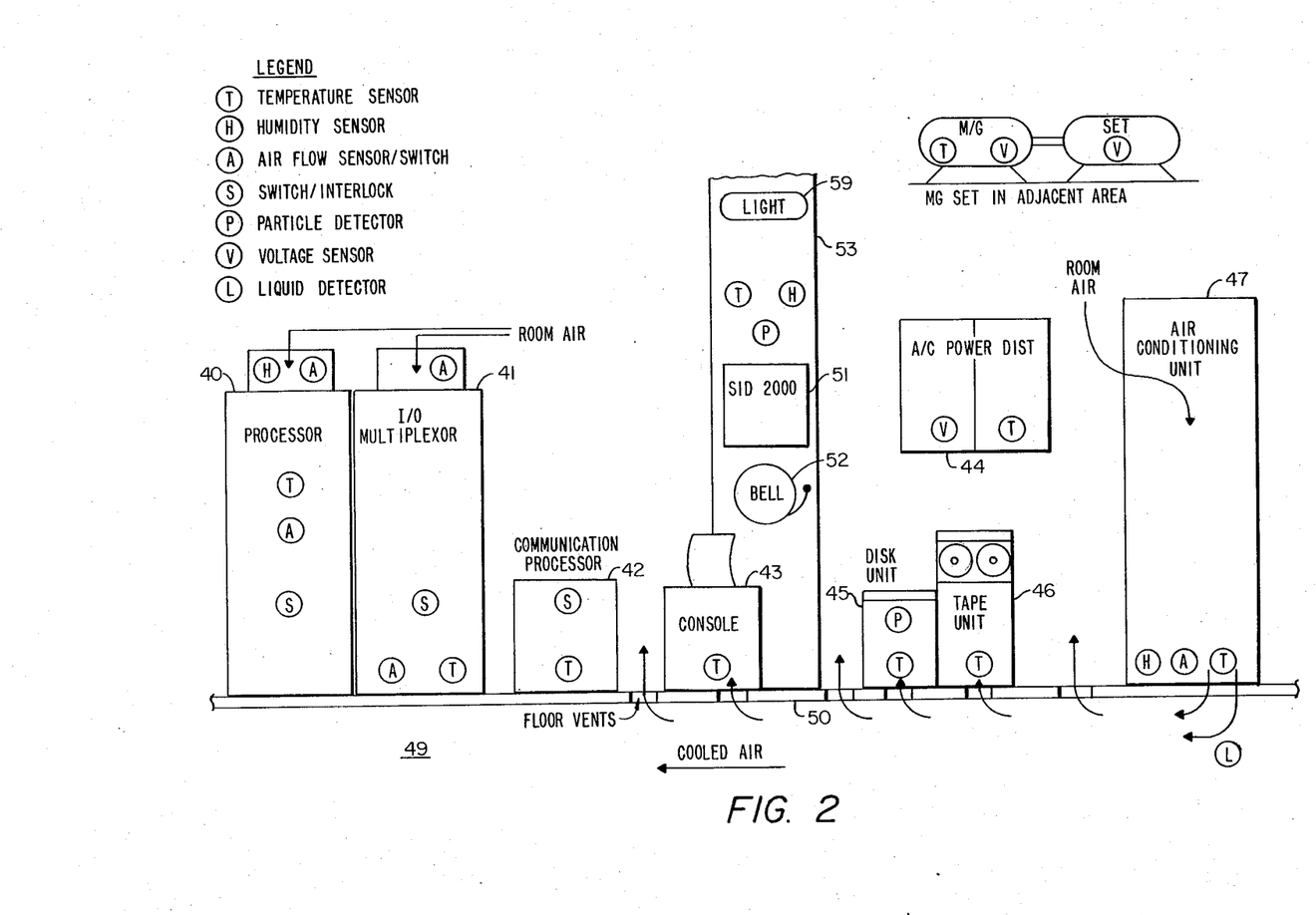
FIG. 2 is a pictorial representation showing part of a computer room and where environment monitoring and other types of sensors may be located therein.

When an alarm condition occurs and a computer site is unattended an alarm signal is immediately sent to processor 18 that causes autodialer 23 to be activated and forward a recorded alarm message to a remote site as previously described. If the computer site is attended an alarm message is first given at CRT 56 of console 28. When the visual alarm message at CRT 56 is not acknowledged before several readings from the sensor are received, the program then causes a visual alarm enable signal to be sent to processor 18 in SID 10. The visual alarm enable signal causes processor 18 to activate a major visual alarm 22, via output module 20 which may be a flashing light on a pillar or wall as represented in FIG. 2. When the major visual alarm still does not cause the alarm condition to be acknowledged at console 28 within a predetermined period of time, an audible alarm enable signal is generated and forwarded to SID processor 18 which causes activation of audible alarm 58 via output module 20. This audible alarm is loud enough that it should get the attention of the maintenance personnel who should acknowledge it at console 28. Upon an alarm at any level being acknowledged at console 28, the subsequent alarms are not activated. In the worst case, if the loud audible alarm is not acknowledged at the attended computer site within a predetermined period of time, still another alarm enable signal is sent to processor 18 in SID 10 which causes autodialer 23 to be enabled to pass the alarm condition on to a remote location. Auto dialer 23 is set up so that when it is energized it initiates a telephone call to the remote attended site and plays a pre-recorded message indicating the alarm. Auto dialer 23 will periodically recall the remote site to place the same alarm message call until it is disabled from doing so. To disable autodialer 23, the maintenance person at the remote site who receives the alarm message call dials back to auto dialer interface 54 and, when auto dialer interface 54 answers the call, sends a specific touch tone signal. Auto dialer 23 responds to the touch tone signal via control from autodialer interface 54 to stop repeating the alarm message call. Processor 18 stores an indication of the message acknowledgement and the number of times that the call was repeated until acknowledged. Host processor 27 periodically interrogates SID processor 18 and retrieves this information which it then stores with a time and date stamp in the appropriate records of the history file, and in the working copy table in main memory 25 for the sensor that caused the alarm. Thereafter, it is up to the maintenance personnel at the remote site to initiate remedial action.

After the periodic collection and storage of each set of sensor data from all sensors via SID 10, host processor 27 under control of the ANALYSIS program first compares the most recently received sensor data, which is stored in the working copy table for each sensor, with the maximum, minimum and rate of change values stored in the previously described point table (PTBL) for the associated sensor. Initially, some of the stored values in each point table are default values, but the owner of the computer system may initially or at a later time set the default values to other values as they wish.

For sensors such as open door and liquid level there are no minimum and rate of change values. A water pipe or the air conditioning system in the room in which computer system is located may become faulty and leak into an underfloor space below the computer system where all cabling and some conditioned air is routed. A liquid level sensor is located under the floor and detects the presence of the water. With water present there is a closed switch that causes a first binary digit to be output from input direct current module 16. When no water is detected there is a second binary digit output from direct current module 16. These binary digits are zero and one. When host processor 27 under control of the ANALYSIS program checks the most recently stored binary number from each liquid level sensor and detects the first binary number it knows water is present and action is taken. Host processor 27 first displays the alarm message at CRT 56. Subsequent alarm actions caused by non-acknowledgement of the alarm message are described in a previous paragraph.

Periodically, as desired, the maintenance personnel or system owner can initiate a request causing a histogram program to read out the stored sensor data in the sensor records in the history file for all or specified ones of the sensors and create histograms showing how the data is changing over a specified period of time for the specified sensors. The histogram is displayed on CRT 21 or other video terminals (not shown) that are connected to host computer system 17, and the histogram may also be routed to a printer 55 at the console for a hard copy printout. Alternately, maintenance personnel at a remote site may place a data call via a telephone line to modem 31, be connected to host processor 27 via communication processor 24 and I/O processor 26, and request that the histogram program be run by processor 27. The resulting histogram is then transmitted via modem 31 to the remote site for display thereat. The maintenance personnel, either local or remote, analyze the histograms to determine the state of the environmental conditions being monitored and can identify potential environmental problems before they actually become problems causing damage and causing computer down time. Remedial action may then be initiated to make changes that will prevent the problems from occurring. This maximizes up time for the computer system and also minimizes lost or damaged data caused by system components that have failed.

Other than monitor environmental conditions, sensors may also be used to monitor operating conditions within components of the host computer system. For example, DC voltage levels from power supplies, and AC power supply levels may be monitored to make sure that their outputs stay within defined voltage specifications. In addition, access doors to the computer room and particular pieces of computer equipment may be monitored to detect when they are opened.

Up to this point in the detailed description, all the records and files in main memory 25 used for the operation of the novel environment monitoring system have not been described. There is one record associated with each sensor. Briefly, within each record it has been mentioned that there is stored sensor data collected from each of the sensors. When there is no change in the level of the output from a sensor, all new readings are not stored until there is a change. Only readings once an hour are stored from the non-changing sensors until there is a change. Using the time and date stamps on the stored readings the HISTOGRAM program can fill in the unchanged and unrecorded entries. There is also a sensor library (SLIB) file in which is stored data and parameters regarding each of the types of sensors. The SLIB is only used initially to write the parameters into the point table (PTBL) of the working copy table associated with each sensor. This parameter information is used by the SCAN and ANALYSIS programs for converting raw digitized data received from a sensor into a value such as degrees Fahrenheit or Celsius. There is also a duplicate history file (HISC) into which the contents of the history file (HIST) are copied when they are to be used to prepare histograms to be transmitted to a remote site via telephone line. Further, there is a working copy table of which information from the point table file is part and in which are stored in individual fields the current and previous four readings from each sensor. The collection and storage of readings from sensors in the working copy table and the records of the history file are described further in this specification with reference to FIG. 3. As a new reading is received the oldest reading is eliminated from the particular working copy table. It is the sensor data in the working copy table that it is used for analysis to determine if a reading is out of bounds in a maximum direction, a minimum direction, or as a rate of change. This analysis is described with reference to FIG. 5. There are also other files. A file designated TCSL is used to store records of all requests made to the console, and a file designated FCSL is used to store records of all the responses received from the console. This is done because the scanning and storing of sensor data has the highest priority and to protect this priority all communications are handled through the TCSL and FCSL files.

In FIG. 2 is shown a pictorial representation of a part of a computer room and representatively shows where environment monitoring and other sensors would be located. Large computer systems are typically installed in special constructed rooms that are generally kept closed, that have their own air conditioning systems to maintain a cool operating environment for the equipment that makes up the computer system, and that filters the air in the room. Cooling is required because the computer equipment generates a lot of heat and, in a closed room, the temperature would rise rapidly to temperatures that will cause equipment failures. Many computer rooms have raised floors so that cabling between pieces of equipment be out of sight under the floor. In addition, the under floor space is often used as a pressurized air plenum through which cooled air passes and then is vented next to or inside pieces of computer equipment. To do this, part or all of the cooled air output from the air conditioning system is forced under the raised floor and there are vents through the floor at required points. This is representatively shown in FIG. 2.

Representative computer equipment shown in FIG. 2 are processor 40, input/output multiplexer 41, communication processor 42, console 43, AC power distribution panel 44, hard disk memory 45, magnetic tape drive 46, air conditioning unit 47, and motor/generator set 48. Also shown are the SID 2000 apparatus 51 used for monitoring the environment of the computer system, a bell alarm 52, a visual alarm 59, and a plurality of sensors for monitoring the environment in the computer room.

As represented in FIG. 2, air conditioning unit 47 takes room air, cools it, and blows it into under floor space 49. There are a number of vents through floor 50 which allow the cooled air to rise up into the computer room at numerous locations such as shown by the arrows by console 43, hard disk unit 45 and tape drive 46. In addition, processor 40 and I/O multiplexer 41 have their own internal air circulation fans that circulate cooled room air through these equipment housings.

Temperature sensors are shown in FIG. 2 as circles with a "T" in them and are located to monitor temperature inside the cabinets of processor 40, I/O multiplexer 41, communications processor 42, console 43, AC power distribution panel 44, hard disk unit 45, magnetic tape unit 46, and air conditioning unit 47. Temperature sensors are also placed on a pillar 53 and under floor 50. The temperature sensors monitor the equipment and room temperatures. Humidity sensors are shown as circles with an "H" in them and are located over processor 40, on pillar 53, and monitoring cooled exhaust air from air conditioning unit 47. Humidity is monitored because if the air in the computer room is too dry static electricity problems arise that can damage the computer equipment and otherwise cause the loss of data. Air flow sensors are shown as circles with a "A" in them and are located inside the equipment housings of processor 40 and I/O multiplexer 41 to check that the cooling fans inside of these equipment housings are functioning. An air flow sensor is also located inside air conditioning unit to check that the circulation blower therein is functioning. AC voltage sensors are shown as circles with a "V" inside and one is located with AC power distribution panel 44 to monitor for AC power failures. DC voltage sensors are also shown as circles with a "V" inside and one is located with motor-generator set 48, which provides emergency DC power to the computer equipment, to monitor its output voltage level. Airborne particle sensors are shown as a circle with a "P" inside and are mounted on pillar 53 and inside hard disk memory unit 45. Airborne particles in the form of dust are very detrimental to disk drives and cause data drop outs. Liquid level sensors are shown as a circle with an "L" inside and one is located under floor 50 beneath air conditioning unit 47 to monitor for water leaking from this unit.

As previously described, when a trouble condition is detected and the initial alarm message at CRTs 56 and 21 is not acknowledged at console 28, the environment monitoring equipment 51 under control of host processor 27 first causes a visual alarm 22 and then audible alarm bell 52 to be energized to alert computer system maintenance personnel in the computer room. The maintenance personnel can look at CRT 56 which is a part of console 28, or at CRT 21, to find out what type of sensor and its location that caused the alarm to be generated, and can then investigate the matter and take remedial measures.

Figure 3:
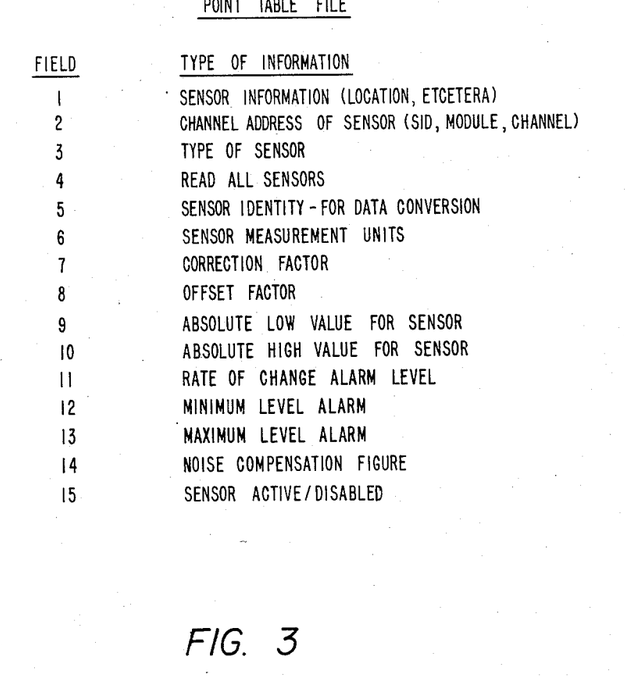
FIG. 3 is a table showing the contents of a portion of a working table in which is stored information regarding the associated sensor.

The sensor data stored in each point table record is shown in FIG. 3 which is described hereinafter. The first field in the point table contains general identity and location information regarding the associated sensor. The second field contains a three digit number which is the channel address of the particular sensor. The first digit of the channel address indicates the particular sensor interface device 10 (SID) that the particular sensor is connected to. This is needed when there are so many sensors that more than one SID 10 is required to scan their outputs. The second digit of the channel address indicates which interface module (i.e. modules 15 and 16 in FIG. 1) the particular sensor is interfaced through. Finally, the third digit of the channel address indicates the particular input channel on the particular interface module identified by the second digit. With these three digits in the second field of the channel address the particular sensor identified thereby may be addressed automatically, or manually from console 28.

The third field of each point table contains an entry indicating if the interface module 15 or 16 to which any particular sensor is connected is an intelligent module. The fourth field of the point table contains information indicating if all sensors connected to the module identified in fields two and three are to be read out. The fifth field contains information identifying the particular sensor. This identity is needed to convert raw data received from the sensors. For example, if the particular sensor is a temperature sensor a binary number indicating a voltage is returned from SID 10. Using the sensor identity information in the fifth field the voltage indicated by the binary number can be converted to a temperature. The sixth field operates in conjunction with the fifth field and indicates the units of the measurement for the sensor. For the example of the temperature sensor, the sixth field is used to indicate if the measurement is in Fahrenheit or Centigrade degrees. The information in the fifth and sixth fields is not required for outputs from sensors such as water present and door open sensors, but is required for analog output sensors such as the temperature and humidity sensors.

The seventh field of each point table contains a correction factor which is used to correct the converted reading. It can be understood that this information is needed for readings from analog type sensors, such as a temperature sensor, but is not needed for water present or door open sensors.

The eighth field of each point table indicates an offset factor to be applied to each converted sensor reading. The ninth field indicates an absolute low value for the particular sensor. The tenth field indicates an absolute high value for the particular sensor. The use of the absolute high and low values in fields nine and ten is described in more detail further in the specification with reference to the CHECK program flow chart in FIG. 5. Briefly, when an alarm is given the rate of change is calculated using the five sets of data in the working copy table associated with the sensor that caused the alarm, and this calculated rate of change is then used to determine the time until the readings from the alarm causing sensor will reach the appropriate one of the absolute values. The eleventh field is used to indicate a chosen maximum slope or rate of change of the output of the associated sensor beyond which an alarm indication is to be given. When the rate of change of a sensor readings exceed this stored value it is assumed that there is a problem. Host processor 27 under the control of the SCAN program uses the five sets of sensor data stored in the working copy table to calculate the recent rate of change of the output from the sensor and stores it for later use by the CHECK program which compares it to the figure stored in field eleven. If the calculated rate of change is greater in either a negative or positive direction than the stored value in field eleven the program selectively enables one of the previously mentioned alarms.

The twelfth field contains a number that indicates the chosen low level output from the sensor below which an alarm indication is first given at the CRT 56 at console 28. The thirteenth field similarly indicates the chosen high level output from the sensor and above which an alarm indication is first given at the CRT 56 of console 28. The CHECK program compares the most recently received sensor data against the entries in fields twelve and thirteen to determine if an alarm should be given. Field fourteen is used to store a noise figure which is added or subtracted from sensor readings stored in the working copy table to dampen swings in readings caused by noise. This has the effect of reducing false alarms caused by noise conditions.

The fifteenth field of each point table is a single bit which indicates if the associated sensor is active or is disabled. If a sensor is determined to be defective after causing an erroneous alarm, to prevent subsequent erroneous alarms until the sensor is replaced or otherwise repaired, the sensor is disabled. That is, the output from the sensor is ignored because the entry in field fifteen indicates that the sensor is disabled. Maintenance personnel using a keyboard 57 at console 28 access the point table for the particular sensor and write into this fifteenth field that the sensor is disabled. After the sensor is replaced or otherwise repaired, the entry in field fifteen is changed to indicate that the sensor is again enabled.

Figure 4:
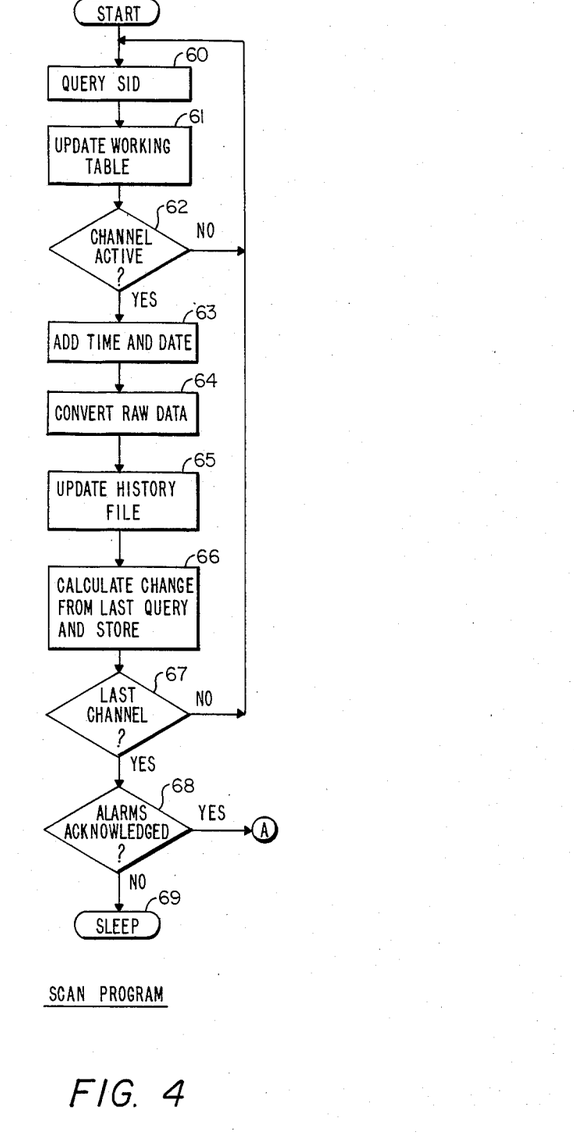
FIG. 4 is a flow chart showing the steps in the operation of a scanning program used to obtain and store the digitized outputs from sensors.

In FIG. 4 is shown a flow chart showing the steps of the SCAN program in collecting data from the sensors and storing same in the sensor records of the history file and in the working copy table before analysis. The program represented by this flow chart is repeatedly being run. Typically, it is run once a minute, and collects data from all sensors. Accordingly, the program cycles once for all sensors and then is placed in a sleep state to be rerun about one minute later. The one minute figure is arbitrary and is a default sensor reading period that may readily be changed.

When the program represented by the flow chart in FIG. 4 is started at block 118, he sensor interface device 10 (SID) shown in FIG. 1 is queried and the digital data output from each sensor is serially transmitted to host processor 27 in computer system 17. This is represented by block 60 in FIG. 4. The format of the communications has previously been described in this specification. Upon the data from each sensor being received it is first placed in the working copy table associated with the particular sensor, as shown by block 61. As previously mentioned there are only a total of five consecutive readings from the particular sensor stored in the working copy table and, upon receipt of a new reading, the oldest reading is eliminated. As represented by decision block 62 field fifteen of the point table is checked to determine if the particular sensor (channel) is active. The parameters in the point table are the same as the sensor library which has previously been described with reference to FIG. 3. If the answer is no, processing reverts back to block 60 and SID 10 is queried for the output of the next sensor. A channel may be inactivated by the system operator if the sensor is defective as previously described. If the answer to the active channel inquiry is yes, the time and date of the query is added to the sensor data in the working copy table as shown by block 63. The digitized sensor data, which is in raw form, is then converted to an understandable form using the parameter data stored in field seven of the point table portion of the working copy table associated with the sensor. This is represented by block 64 in FIG. 4. The data in converted form indicates, for example, a figure in degrees, or air flow in cubic feet per minute. The converted data is then stored in the record in the history file for the particular sensor as shown by block 65. The newest sensor data is then compared with the previous sensor data to calculate the rate of change of the data, and this calculated rate of change figure is stored in the working table for the sensor. This calculation and storage is represented by block 66. Next the program checks if the sensor data just received, converted and stored is from the last of the sensors as represented by decision block 67. If the data is not from the last sensor th program cycles back to block 60 to repeat the steps just described for the next sensor. If the data was from the last sensor, sensor data collection is completed and will not be repeated for another minute.

Figure 6:
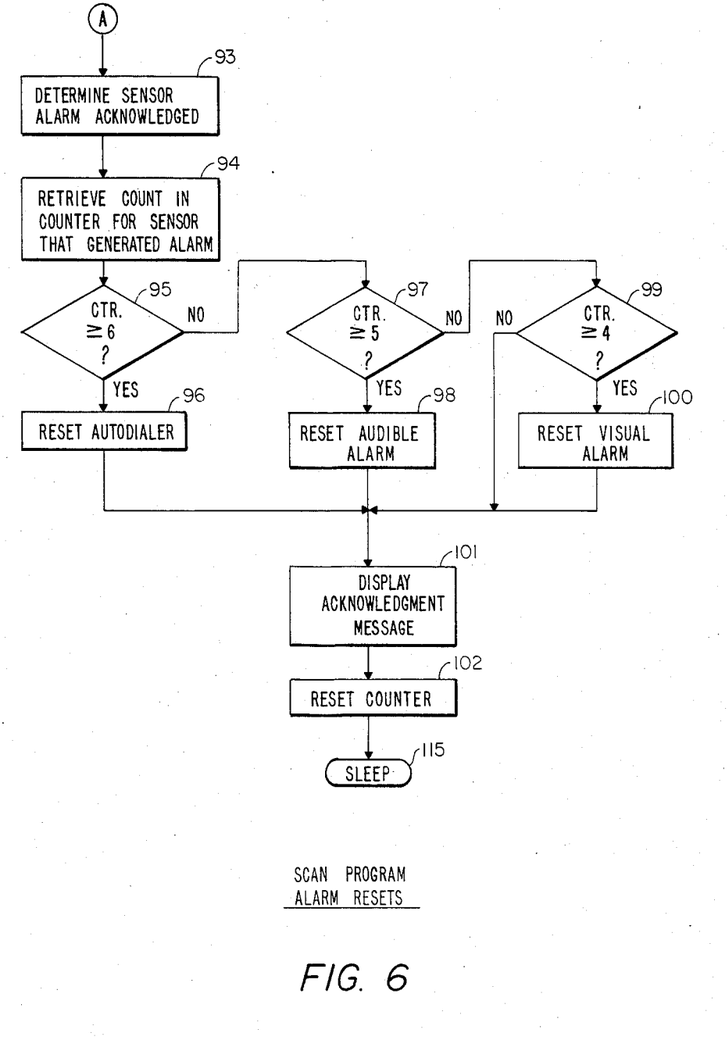
FIG. 6 is a flow chart showing the steps in an alarm reset program.

Finally, as shown in decision block 68, a check is made to determine if any acknowledgements of alarm indications have been received. If the answer to this determination is no, the program goes to sleep for one minute, per block 69, and then repeats the steps described above for all sensors. However, if the check determines that an alarm acknowledgement has been received via console 28 or from a remote site via autodialer interface 54, the program branches to another program represented by the flow chart in FIG. 6 to determine which alarm has been acknowledged and then that alarm is reset. The branch is shown as the letter A in a circle in FIG. 4. The program represented by the flow chart in FIG. 6 is described further in this specification.

Figure 5:
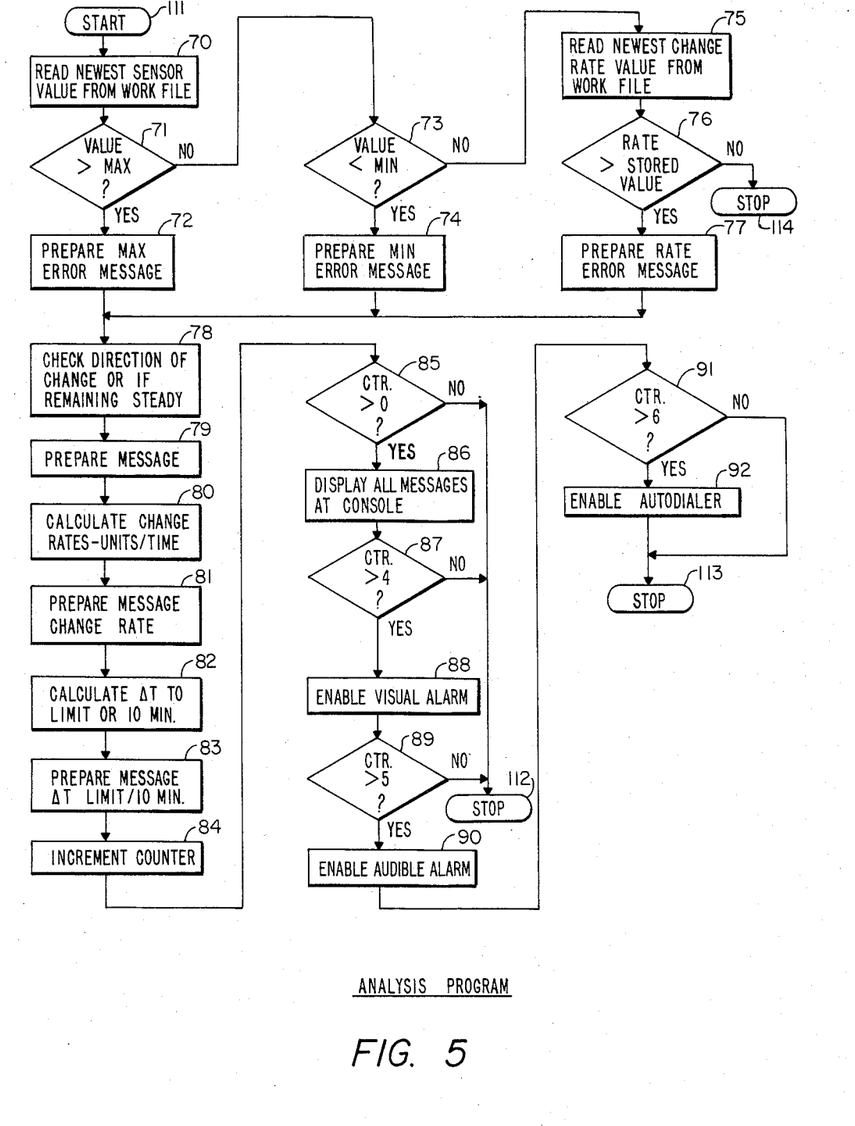
FIG. 5 is a flow chart showing the steps in analyzing stored data to determine if any sensor measurements indicate a situation for which alarms are to be energized.

In FIG. 5 is shown the flow chart for the ANALYSIS program that is run after sensor data has been received and stored by the SCAN program. The ANALYSIS program checks the newest data received from the sensors and stored in the working copy table against the maximum, minimum and rate of change parameters stored in the point table to determine if an alarm should be given and, if so, what type of alarm. The parameters are selected by the owner of the computer system as previously mentioned. The stored parameters initially have a default value level but may be changed at any time as experience with the computer system indicates is necessary. The program represented by the flow chart shown in FIG. 5 is run once for the received and stored data for each of the sensors, starting after each new set of data is received from the sensors via SID 10.

When the ANALYSIS program starts at block 111, the first step is to read the newest sensor data for a particular sensor from its work copy record, as shown by block 70. The program then retrieves the stored maximum sensor value, at and above which an alarm is to be given, copied from the point table file (PTBL) into the sensor working copy table and compares it against the newest sensor data as shown at decision block 71. If the pre-stored maximum sensor level has been exceeded an error message is prepared for display at console 28. This is done at block 72.

If the answer to the determination of whether or not the maximum sensor level has been exceeded is no, the program then branches to decision block 73 to check if the latest sensor reading is less than the stored minimum sensor level. If the latest sensor reading is lower than the stored minimum sensor level the program branches to block 74 and an appropriate error message is prepared for display at console 28. However, if the latest sensor reading is not lower than the stored, minimum default value, the program branches to block 75 to check the rate of change of the last few sensor readings. To do this, the rate of change calculated at block 66 of the SCAN program is read out and compared with the maximum rate of change stored in the work copy record for the particular sensor. If the calculated rate of change is not greater than the stored parameter, the program exits block 76 and comes to a stop at block 114 because the latest sensor reading does not exceed any default values. The program then goes back to block 111 and restarts to analyze the data from the next sensor. However, if the rate of change is greater than the stored default value, the program goes to block 77 and prepares a rate of change error message.

When there has been an out of bounds determination made at one of blocks 71, 73 and 76 and an error message has been prepared, the program progresses to block 78 and checks the direction of change of the latest sensor reading with regards to the previous sensor reading and, if there is no direction of change, checks if the sensor reading value is remaining steady. The latest reading can be out of bounds but be the same as the previous sensor reading, less than the previous sensor reading, or greater than the previous sensor reading. Whatever the determination is from block 78, in block 79 a message is prepared indicating the result.

At block 80 the program takes the latest stored sensor reading and the previous readings stored in the working copy table and calculates the change rate in units/time. Thereafter, at block 81, the program prepares a message indicating that rate of change to be displayed at CRT 56. At block 82 the program uses the rate of change previously calculated and, if the maximum or minimum limits haven't been exceeded, calculates the time to reach those limits assuming that the rate of change doesn't vary in subsequent sensor readings. If the maximum or minimum limit has already been exceeded the program calculates what the sensor output would theoretically be in ten minutes if the rate of change doesn't vary in subsequent sensor readings. After either of these calculations is done the program goes to block 83 and prepares a message indicating the information just calculated in block 82.

After the calculations are made and messages prepared in blocks 79, 81 and 83, a counter located in the working copy table associated with the particular sensor is incremented by one.

At block 84 the program then checks the count in the counter mentioned in the last paragraph. First, in block 85 the program checks if the count in the counter is greater than zero. When an alarm condition has been detected for the first time, as described with the sensor reading checks performed in blocks 71, 73 and 76, the count in the counter goes from zero to one. The output from decision block 85 will be a yes and the program goes to block 86 which causes all previously prepared messages (blocks 72, 74, 77, 79, 81 and 83) to be displayed on CRT 56 of console 28. As previously described, a first alarm condition only results in a message being displayed on CRT 56. There are no other visual or audible alarms energized until subsequent times that an alarm condition is detected from the same sensor. Alternately, if no alarm condition has been detected, at this point in the program the output from decision block 85 is a no and the program stops at block 112. The ANALYSIS program will restart at block 111 if there remains a sensor, the latest readings of which have not been checked.

The next counter check is made at decision block 87 which checks if the count in the counter is greater than four. The count of four indicates that on subsequent reading and checking of the particular sensor an alarm condition has continued to be detected but not acknowledged. As the counter is being incremented up to four, only the messages to CRT 56 are regenerated each time at block 86. Until the counter reaches the count of five the program exits decision block 87 as a no and the program stops at block 112. However, when a count of five or greater is detected, the program goes to block 88 which causes the visual alarm lights 22 to be energized via SID 10 as previously described. These alarm lights 22 hopefully get the attention of the maintenance personnel who check the CRT at the console to determine what and where the trouble is.

If visual alarm 23 is not acknowledged at console 17, the counter in the working copy table is again incremented to six. At this level the program goes to block 90 which causes an audible alarm 58 to be enabled via SID 10 as previously described. When audible alarm 58 is not responded to, the count in the counter increments again and the output from decision block 91 is a yes. This causes autodialer 23 to be energized per block 92. The autodialer forwards a trouble message to another site as previously described. At this point the program has completed it steps and at block 113 it stops.

The program shown in flow chart form in FIG. 5 and described above is repeated for each sensor. In this manner the data from each sensor is analyzed before the next time that the SCAN program shown in flow chart form in FIG. 4 is run again to gather readings from all the sensors.

The sequence of alarms described hereinabove may be varied by those skilled in the art without departing from the teaching of the invention. For example, in setting up the system it may be decided to dispense with CRT messages, visual alarms and even audible alarms when there are certain problems. For example, if water is detected, after two or three sequential indications of same from a sensor, an autodialer may be enabled to call a plumber directly to come, locate and fix the problem. In addition, other types of alarms may be used including in building hard-wire and/or radio pagers. Whatever alarms are used, they may be operated in any sequence. The sequence of CRT message, visual alarm and audible alarm described above is only one combination.

In FIG. 6 is shown the flow chart for the program branch shown as an A in a circle in FIG. 3. This program branch is used to reset alarms that have been acknowledged via console 28 at host computer system 17. The starting point into this program branch is also shown by the letter A in a circle. The first step is to determine which sensor caused the alarm that has been acknowledged from console 28 of the computer system. This is done at block 93. After that determination has been made the program goes to block 94 and retrieves the count in the counter that is part of the working copy table associated with the sensor that caused the alarm that has been acknowledged. In decision block 95 the count in the counter is checked to determine if it is equal to or greater than six. If it greater than six it is known that autodialer 23 had been energized in block 92 of FIG. 5. Accordingly, the program exits to block 96 and resets the autodialer.

If the count in the counter is not equal to or greater than six, the decision at block 95 is a no and the program goes to decision block 97. In block 97 the counter contents are again checked to see if they are equal to or greater than five. If the count is equal to or greater than five the program knows that the audible alarm had been energized in block 89 of FIG. 5 and, accordingly, goes to block 98 to reset the audible alarm. Similarly, if the count in the counter was not high enough to energize the visual alarm, the count in the counter will be less than five. At this count the output from decision block 97 is a no and the program goes to decision block 99. At decision block 99 the program checks if the count in the counter is equal to or greater than four. If the count is equal to or greater than four the program goes to block 100 to reset the visual alarm. If the count is less than four the program goes to block 101.

No matter which alarm has been reset by one of blocks 96, 98 or 100, the program goes to block 101 to display an acknowledgment message at the CRT of the console indicating that the alarm has been acknowledged at console 28. Both the alarm messages and the acknowledgment are stored in the appropriate record in history file (HIST). The last step that is performed is at block 102 which resets the counter in the working copy table associated with the sensor that caused the alarm and that has been acknowledged. The program in FIG. 6 then goes to sleep at block 115 until the SCAN program in FIG. 3 is run again a minute later.

Figure 7:
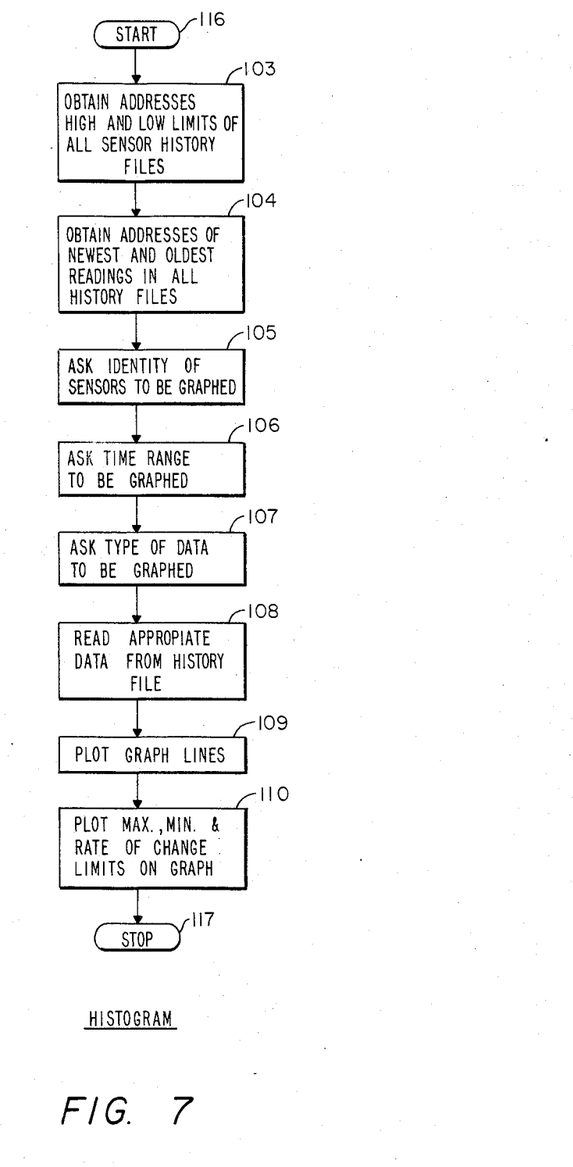
FIG. 7 is a flow chart showing the steps in generating a histogram of the readings from a sensor.

In FIG. 7 is shown a flow chart for the program HISTOGRAM used to generate histograms using the stored sensor readings in the sensor records in the history file. This program starts at block 116 when requested from console 28, from CRT 21, or remotely via modem 31. It could be changed, however, by one skilled in the art so that it is run periodically. As previously mentioned in this detailed specification, personnel at a remote site can also call in via a telephone line and modem 31 to read out the records of the history file for selected ones or all of the sensors. This program represented by the flow chart would then be run at the remote site using the sensor data transferred over the telephone line to generate the histograms.

Typically, someone at console 28, CRT 21, or remotely via modem 31 requests that histograms be generated for one or more of the sensors. This starts the program shown in flow chart form in FIG. 7. Upon being started at block 116, the program first determines the memory addresses of the high and low end extremes of each sensor in the associated record in the history file, as shown by block 103, and then determines the high and low address extremes of the data stored in each sensor record in the history file. Thereafter, the program must identify the sensors, the time limits, and what type of data is to be displayed with histograms. To do this, per block 105 the program inquires via prompts at CRT 56 at console 28 the identity of the sensors for which histograms are to be generated. The operator requesting that histograms be generated inputs this information via keyboard 57. At block 106 the program similarly inquires about the range of time over which the histograms are to cover, and also the time intervals for data readings to be displayed. Again this information is input via keyboard 57. If desired, by specifying time intervals larger than that at which the sensor readings are taken, not all data will be graphed on the histogram. Then, at block 107, the operator is requested to input the type of data that is to be displayed with the histograms. With all this information the program knows all the parameters needed to generate the requested histograms.

At block 108 the program uses the parameters input to it in the previous steps to read the appropriate data out of the records in the history file for the first selected sensor. At block 109 the data read out of the history file and the parameters input to the program are used to graph the histogram on an output device. There are many types of output devices such as CRT 57 and printer 55 at console 28, but there are many other types that may also be used. In addition to graphing the sensor data of the type and over the time range specified, at block 110 other lines are also drawn on the histograms. These other lines are the maximum and minimum limit levels and the rate of change limit level. After the histograms for the selected ones of the sensors are displayed the program stops at block 117 until it is called again.

A failsafe feature is also provided to check the operation of sensory interface device (SID) 10. If host processor 27 under control of the monitoring and analysis programs is unable to connect to SID 10 to request scanning or other functions, a signal in the form of a trouble message is given to the maintenance personnel via CRT 56 at console 28. To acknowledge receipt of the message the maintenance personnel are instructed to operate a particular key on keyboard 57 of console 28. The generation of the trouble message, the acknowledgement reply by key operation, and a time and date stamp are stored in the appropriate record of the history file for the sensor that caused the alarm. At the same time, SID 10 is monitoring to determine if it is unable to connect to computer system 17. If it cannot connect, it activates autodialer 23 to send a trouble message to a remote location so that the problem is brought to the attention of some maintenance personnel and remedial action taken. The failsafe operation is shown in more detail in FIG. 8 which is described in the following paragraphs.

Figure 8:
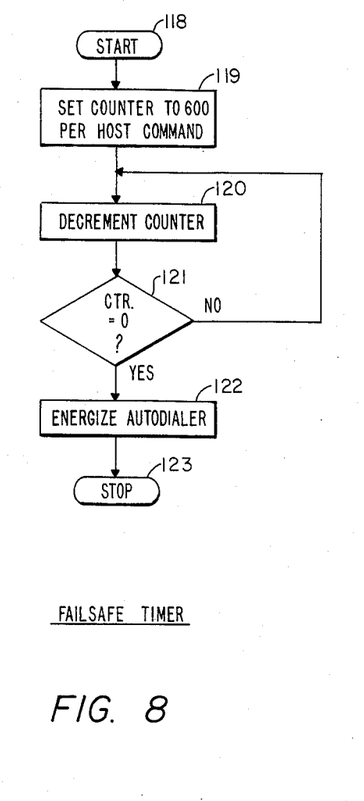
FIG. 8 is a flow chart showing the steps in operating a failsafe timer.

In FIG. 8 is shown a flow chart of the steps performed in implementing a failsafe timer in SID 10 processor 18 to monitor the communication path between SID 10 and host computer system 17. Upon initialization of the novel apparatus for monitoring the operating environment of a computer system, the program shown in FIG. 8 is started at block 118. As part of the initialization, and thereafter preceding every communication to SID 10, host processor 27 sends a command to SID 10 to reset a failsafe counter inmplemented with processor 18 to six-hundred. This is shown at block 119. Per block 120 the failsafe counter is decremented by the count of one every second. Thus, if the counter is not reset, it will count down to zero in ten minutes. Following each decrement the program checks to see if the counter has decremented to zero as shown at block 121. If the answer is no, the program returns to block 120 and the failsafe counter is decremented again. When host processor 27 accesses SID 10 it sends a command to processor 18 to reset the counter in the failsafe timer to six-hundred.

Only in the event that host processor 27 cannot access SID 10 within ten minutes, which means that there is a problem, does the failsafe counter finally decrement to zero. This is detected at block 121, and autodialer 23 is energized at block 122 to place its trouble call to the remote location. The failsafe timer program then stops at block 123 to wait until maintenance personnel locate and correct the trouble and the monitoring apparatus is reinitialized.

Before the expiration of the ten minute count down of the failsafe timer described in the previous paragraphs, host processor 27 will have also detected the failure to communicate. Processor 27 places a message on CRT 56 at console, and on CRT 21 associated with communications processor 24 if the path is intact and processors 24 and 26 are functioning properly. The maintenance personnel can disable the autodialer until the trouble is cleared to stop the trouble message from being transmitted to the remote location.

While what has been described herein is the preferred embodiment of the invention, it should be recognized that many changes may be made in the equipment without departing from the spirit and scope of the invention. For example, other information to be checked may be added to the point tables and then compared to outputs from the sensors. In addition, other types of sensors than those listed herein may be added. Further, many different types of host computers may be used; and any alarm type and sequencing of alarms may be used.

What is claimed is:

1. A method for monitoring an operating environment of a computer system that includes a computer facility housing a central processor and memory for storage of data and programs, said method comprising the steps of:

utilizing monitoring equipment for generating indicator signals indicating a state of a plurality of environmental conditions in and around said computer system including its environment using a like plurality of sensors;

storing over a period of time said indicator signals periodically generated by said sensors along with signals indicating the date and time that each of said indicator signals were stored;

checking said indicator signals to determine if the environmental conditions they indicate exceed one or more predetermined levels including predetermined rates of change over a predetermined period of time and predetermined fixed levels;

providing an alarm indication when said checking indicates that any of said indicator signals has exceeded any of said predetermined levels; and producing a histogram for each sensor using the stored indicator signals from each sensor and the time and date signals associated therewith, said histograms indicating environmental trends in said computer system which can point to potential troubles in the operating environment of the computer system, which potential troubles may be rectified before they actually become troubles that cause damage to the computer system.

2. The method in accordance with claim 1 further comprising the steps of:

detecting the presence of said transmissions between said host computer and said monitoring equipment; and indicating the presence of trouble when said transmissions are not detected.

3. The method in accordance with claim 2 wherein said checking step comprises the steps of:

setting a counter to an initial count;

periodically decrementing said counter by one;

checking the count in said counter every time after it has been decremented to determine if the count has been decremented to zero;

resetting said counter to said initial count every time said computer system accesses said monitoring equipment; and enabling a trouble indication when said checking step indicates that said counter has been decremented to the count of zero.

4. The method in accordance with claim 1 further comprising the steps of:

periodically reading the indicator signals generated by each of said sensors; and transferring said indicator signals to said memory to be used to produce said histograms.

5. The method in accordance with claim 4 further comprising the step of storing predetermined parameters used in checking said indicator signals.

6. The method in accordance with claim 5 wherein said transferring step comprises the step of:

converting the indicator signals to a form suitable for transmissions over a communications link; and transmitting said converting indicator signals over said communications line to a host computer system to be stored in memory.

7. The method in accordance with claim 6 further comprising the step of transmitting said alarm indication to a remote location to indicate trouble with said computer system.

8. The method in accordance with claim 7 further comprising the step of transmitting said histograms to said remote location.

9. The method in accordance with claim 8 wherein said step of providing an alarm indication comprises the steps of:

providing a trouble condition display at a video terminal that is part of said computer system;

providing a visual alarm display in the computer facility where said computer system is located after said trouble condition display is not acknowledged within a first predetermined period of time; and providing an audible alarm in the area where said computer system is located after said visual alarm display is not acknowledged within a second predetermined period of time.

10. Apparatus for monitoring environmental operating conditions of a computer facility including a computer system, said apparatus comprising:

sensor means for generating signals indicating the state of a plurality of environmental conditions in which said computer system operates;

means for checking said indicating signals to determine if the environmental operating conditions they indicate exceed predetermined levels, said checking means providing an alarm signal when it has determined that any one of said indicator signals has exceeded said predetermined levels including predetermined rates of change over a predetermined period of time and predetermined fixed levels;

means for storing over a period of time said indicating signals output from said sensor means along with signals indicating the date and time that the indicator signals were stored; and processor means for producing a histogram for each sensor using the stores indicating signals and the stored time and date signals associated therewith, said histograms indicating environmental trends in said computer system which point to potential troubles in the operating environmental conditions of the computer system, which potential troubles may be rectified before they actually become troubles that cause damage to the computer system.

11. The invention in accordance with claim 10 further comprising interface means for coupling said sensor means to said checking means, said interface means converting said indicating signals output from said sensor means to a form that can be handled by said checking means.

12. The invention in accordance with claim 11 further comprising:

means for periodically scanning said sensor means and reading out said indicating signals to said interface means;

means for temporarily storing said converted indicating signals output from said interface means; and means for transferring said temporarily stored converted indicating signals to said storing means.

13. The invention in accordance with claim 12 further comprising:

means for converting the form of the indicator signals before being transferred to said storing means by said transferring means.

14. The invention in accordance with claim 13 further comprising means for establishing a communications path to a remote location over which histograms prepared using said indicating signals are transmitted to said remote location.

15. The invention in accordance with claim 14 further comprising means for providing alarm indications when said indicating signals exceed said predetermined levels.

16. The invention in accordance with claim 15 further comprising cathode ray tube for providing an alarm visual display when said indicating signals exceed said predetermined levels.

17. The invention in accordance with claim 16 further comprising visual alarm means which is energized when said alarm visual display is not responded to within a first predetermined period of time.

18. The invention in accordance with claim 17 further comprising audible alarm means which is energized when said visual alarm means is not responded to within a second predetermined period of time.

19. The invention in accordance with claim 18 further comprising means for sending an audio message to said remote location.

20. The invention in accordance with claim 19 further comprising means for responding to said alarm visual display on a cathode ray tube means, said visual alarm means, and said audible alarm means.

21. A method for failsafe monitoring operations between a host computer system and equipment monitoring the operation of the computer system, said method comprising the steps of:

checking for the presence of transmissions sent between said host computer system and said monitoring equipment; and indicating the presence of trouble when said transmissions are not received.

22. The method in accordance with claim 21 wherein said checking step comprises the steps of:

setting a counter to an initial count;

periodically decrementing said counter by one;

checking the count in said counter every time after it has been decremented to determine if the count has been decremented to zero;

resetting said counter to said initial count every time said host computer system accesses said monitoring equipment; and enabling a trouble indication when said checking step indicates that said counter has been decremented to the count of zero.

23. The method in accordance with claim 21 wherein said checking step comprises the step of:

checking for the presence of reply transmissions received from said monitoring equipment responsive to transmissions sent from said computer system to said monitoring equipment, said checking being performed by said host computer system.

24. The method in accordance with claim 23 wherein said indicating step comprises the step of:

providing a trouble indicator from said computer system when said reply transmissions are not received by said host computer system from said monitoring equipment.

* * * * *